Patented July 8, 1947

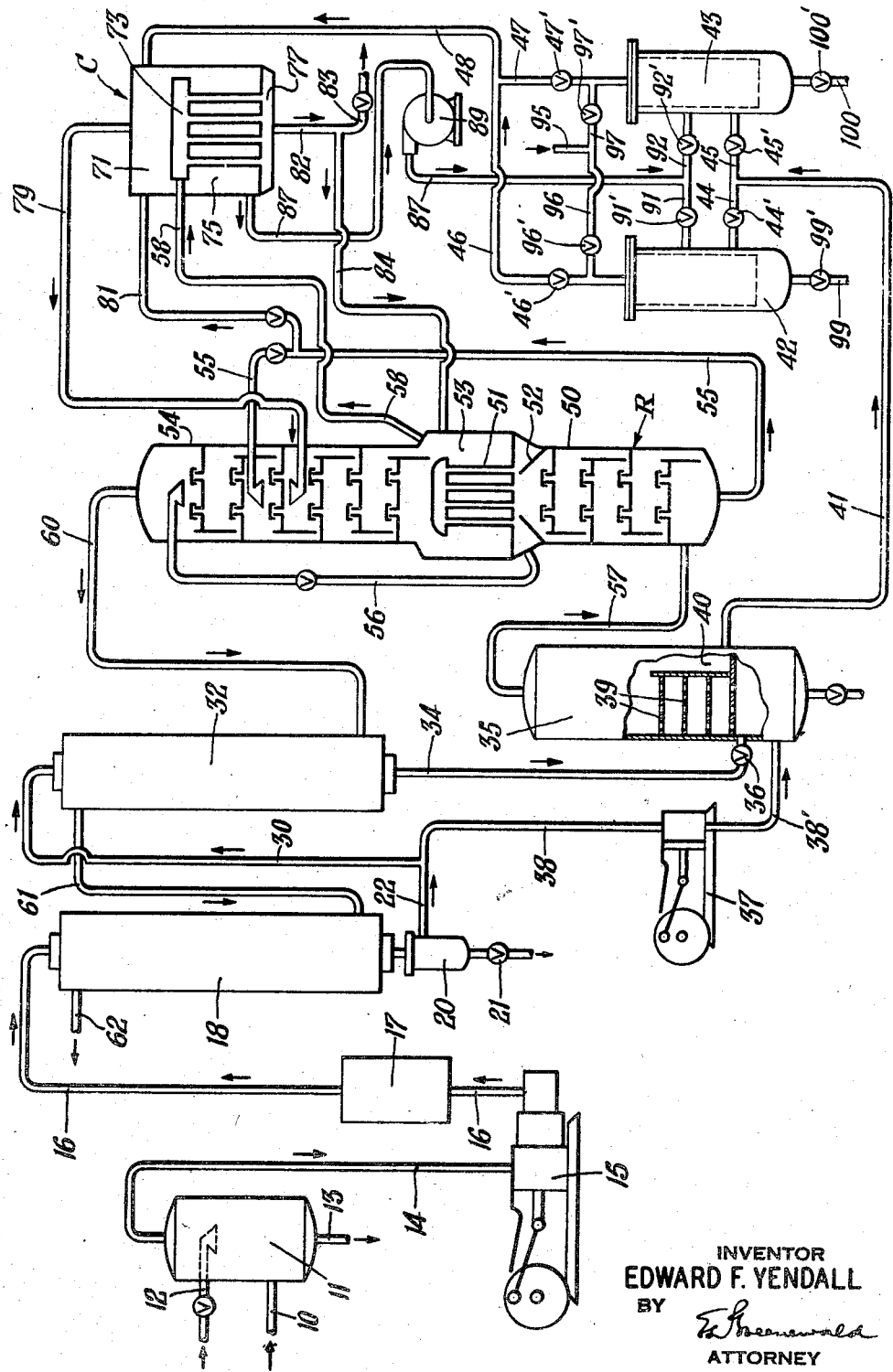

2,423,543

UNITED STATES PATENT OFFICE 2,423,543

PROCESS AND APPARATUS FOR
SEPARATING GAS MIXTURES

Edward F. Yendall, Kenmore, N. Y., assignor to
The Linde Air Products Company, a corporation of Ohio Application August 1, 1944, Serial No. 547,598

12 Claims. (Cl. 62—175.5)

This invention relates to a process and apparatus for separating the components of gas mixtures, and more especially it concerns a process and apparatus for eliminating higher boiling point impurities such as carbon dioxide, hydrocarbons, etc. during or prior to the separation of gas mixtures such as air by low temperature rectification.

The presence of hydrocarbons in the air has caused difficulty because such impurities tend to collect in liquid oxygen produced by low temperature air separation and the impurities become concentrated in portions of apparatus where the oxygen is vaporized, at which points they may constitute a serious hazard. The hydrocarbons exist in air in relatively minute proportions, and are not readily removed during the customary treatment of the air. Additional hydrocarbons are added to the air due to the use of the customary lubricants in the air compressors. Attempts to minimize the hazards caused by hydrocarbon accumulations have included various procedures for separating the impurities from the liquid oxygen. Such methods have not prevented the hydrocarbons from coming in contact with high purity oxygen or from entering portions of the rectification apparatus. Unsuccessful attempts have also been made to prevent entry of the impurities into the low pressure stage of rectification by filtering the liquid which is being transferred from a high pressure stage to a lower pressure stage of rectification.

One procedure used for removing the impurities involves the separation of the compressed and cooled incoming air by means of a scrubber into a substantially impurity-free vapor fraction, and a liquid fraction which carries the impurities, the filtration of such liquid fraction to remove impurities therefrom, and the passage of the impurity-free vapor fraction and the filtered liquid fraction directly to the rectifying apparatus, with or without a step of evaporating the filtered fraction prior to passage into the rectifying apparatus. This procedure involves the use of one or more scrubber-separator devices for separating the vapor fraction and liquid fraction, and means for filtering the latter.

Another procedure involves the use of an auxiliary condenser which comprises a condensing element for condensing a gaseous oxygen product, which element is disposed within an evaporating chamber or reflux compartment, and has a condensate chamber at its lower end. The reflux compartment is supplied with an impurity-containing liquid fraction, and impurity-free vapors produced in the reflux compartment of the auxiliary condenser pass from the top of the latter to an intermediate part of the main rectifying column. Periodically the accumulated impurities are withdrawn from the auxiliary condenser through a suitable drain connection.

The performance of such scrubber-filter interchangers has not always been satisfactory, because the reflux compartment of the auxiliary condenser sometimes collects carbon dioxide snow, solid hydrocarbons, and other solid impurities to an extent such that its heat-transfer capacity is seriously impaired. In certain instances flashes in the main condenser have indicated that all of the hydrocarbon impurities were not retained in the auxiliary condenser reflux compartment.

Among the more important objects of this invention are the following: to provide in novel manner for eliminating higher boiling point impurities from a gas mixture separated by rectification at low temperatures; to provide in novel manner for continuously removing solid impurities from a gas mixture being separated; and to provide for the removal of such solid impurities from the constituents of air being separated while the oxygen content of the fluid being processed for such solids removal is sufficiently low to prevent or inhibit the flashing of hydrocarbon impurities.

These and other objects will be apparent from the following description, and the accompanying drawing, wherein the figure is a diagrammatic elevational view of one arrangement of apparatus forming part of the invention.

In the practice of a preferred form of the invention, the air to be rectified is compressed and cooled in the usual manner. The compressed air is cooled while under pressure to a temperature below the critical temperature, so that a portion of the air will be liquefied on expansion to an intermediate pressure. In order to avoid the necessity of filtering all of the air, and for the purpose of bringing the solid carbon dioxide particles and other solid impurities carried by the air into a more readily filterable form, all of the cold air is then scrubbed at a lower pressure with liquefied portions of the air. These solid impurities are retained by the liquid fraction. The impurity-free gaseous fraction of the air may be passed directly into the rectifying apparatus. The liquid fraction which now contains all of the solid impurities is filtered by passing it through one of a pair of duplicate filters. During the filtration the solid carbon dioxide and hydrocarbon impurities collect on the filter surface and are removed. The filtered liquid fraction then may be passed into the vaporizing compartment of an auxiliary condenser and there employed to condense a gaseous oxygen product flowing from the rectification stage, the filtered liquid being vaporized in part by such heat exchange. The resultant vapors flow to a low pressure stage of the rectifying apparatus. The unvaporized portion of the filtered liquid, which may correspond to around 10% of the total amount of the scrubber liquid, and may contain around 65% of oxygen, is withdrawn from the reflux compartment of the auxiliary condenser, either continuously or intermittently and forced through one of the aforesaid duplicate filters in conjunction with the liquid fraction flowing from the scrubber. Preferably the usual step of treating the compressed and cooled air for chemical separation of carbon dioxide is omitted, since the solid carbon dioxide in the liquid fraction facilitates the filtration of hydrocarbon impurities from that fraction.

An important feature of the present procedure for eliminating impurities involves the use of a liquid oxygen pump which withdraws a small selected portion of the filtered liquid enriched in oxygen from the reflux compartment of the auxiliary condenser, and forces such liquid through a filter concurrently with the liquid fraction of lower oxygen content from the scrubber, conveniently in the proportions of one part by weight of the former to around ten parts to twenty parts of the latter liquid. The resultant filtered liquid mixture, which may conveniently contain about 35% of oxygen, and preferably contains not substantially more than 50% of oxygen, then is returned to the reflux compartment of the auxiliary condenser. This arrangement provides an independent circuit whereby solid impurities first formed in such reflux compartment by evaporation of portions of the filtered liquid mixture and/or any impurities passing through a defective filter stone, may safely and effectively be isolated from the liquid fraction and collected in the filters, with the assistance of the much larger bulk of solid impurities serving as a filter aid. It has the further advantage that the body of solid hydrocarbons and other solid impurities is always maintained in contact with a liquid containing not more than about 35% of oxygen.

In previous processes, the solids formed in the reflux compartment were largely eliminated by a periodic draining of the latter. This never completely removed the solids; and heat transfer in the auxiliary condenser was impaired. Also, loss of oxygen resulted. The operation balance in the rectifying columns and other parts of the system was upset, and control of the operation rendered difficult. Furthermore, such draining did not prevent the entraining of small amounts of impurities with vapors leaving the reflux compartment as the concentration of the impurities in the liquid being boiled increased.

By adjusting the conditions of operation such that only small portions of the filtered liquid in the reflux compartment, for example, a volume corresponding to around 5% to 10% of the liquid fraction flowing to such compartment, is pumped to the filter through the new circuit, the oxygen content of the liquid mixture passing through the filter is not raised to a point where additional hazards are incurred, and yet the solids removal efficiency from the reflux compartment is satisfactory.

To illustrate, since the liquid fraction from the scrubber contains about 32% of oxygen, a 10% addition thereto of the reflux liquid containing about 65% oxygen provides a mixture having an oxygen content of about 35%. This recirculation of reflux liquid does not change the oxygen content of the liquid in the reflux compartment, which remains at 65% in approximate equilibrium with the 32% oxygen vapor leaving the compartment.

A 10% recirculation will limit the percentage of solids in the liquid in the reflux compartment to about that in the scrubber liquid fraction, in instances where the filter efficiency is about 91% or more. Thus, in an instance where 1000 parts per million of solid carbon dioxide are present in the scrubber liquid fraction, and the filter efficiency is 91%, and 10% of the filtered liquid is recycled, there will be about 90 parts not removed from the original scrubber liquid which, when concentrated in the reflux compartment will result in about the same concentration of impurities in the recirculated liquid as in the scrubber liquid. Thus, the impurities passing through the filters are carried back to the inlet of the filters so that removal is eventually complete.

Whatever the filter efficiency may be, the recirculation always carries back to the filter the impurities not removed on the first pass, and eventually all the impurities become enmeshed on the filter and retained, so that removal thereof from the liquid is complete.

The accompanying drawing illustrates diagrammatically one arrangement of apparatus for carrying out the principles of the invention, and is especially applicable to plants producing liquid oxygen. Various cycles for the refrigeration and partial liquefaction of the air can be employed; and any of the customary procedures may be used for drying the air. In the form shown, the air entering the unit through inlet 10 preferably is washed with water in a scrubber 11 supplied at its upper end with water through a valved connection 12, the wash water leaving through line 13. Other means for cleaning the air may be substituted. The air then passes through conduit 14 into the low pressure cylinder of a multi-stage air compressor 15 wherein the air is compressed to a high pressure which may be as high as 3000 pounds per square inch. The compressed air leaves the compressor through pipe 16 having therein an after-cooler 17, and passes through the high pressure tubes of a heat exchanger 18. The lower ends of the high pressure tubes communicate with a trap 20 which collects water condensed in the exchanger 18. Water so collected may be periodically blown from trap 20 through valve 21.

The air leaves trap 20 through conduit 22 having branches 30 and 38. Conduit 30 conducts about half of the air to the upper header of a main continuous countercurrent heat exchanger 32. A conduit 34 conducts the cold high pressure air containing particles of solid carbon dioxide from exchanger 32 into the lower portion of a scrubber-separator 35. The conduit 34 preferably has therein an expansion valve 36 for reducing the pressure of the air to that of the scrubber 35 which may, for example, be substantially the same as the pressure in the high pressure stage of rectification, or it may be somewhat higher. On expansion through valve 36 the air separates into liquid and gaseous phases.

Branch line 38 leads to an expansion engine 37 wherein the air is expanded to the pressure of the scrubber 35 and, due to the production of external work, the temperature of the air is reduced to a very low value. The expanded air is then conducted to the lower portion of the scrubber through conduit 38'.

The scrubber 35 is provided with gas and liquid contact means, which preferably comprise a series of perforated plates 39 having relatively large perforations. The plates are disposed above the inlet conduits 34 and 38', and extend upward for a short portion of the scrubber. A relatively large vapor space is provided above the plates to facilitate release of entrained liquid. An overflow cup 40 maintains the liquid level slightly above the upper plate 39.

The liquid fraction containing the solid carbon dioxide and hydrocarbon impurities is conducted from cup 40 to one of a pair of filters 42, 43 through conduit 41. The filters conveniently may be similar to filters 42, 43 described in U. S. Patent No. 2,337,474 of H. C. Kornemann and E. F. Yendall. Conduit 41 has two branches 44, 45, controlled by valves 44', 45', connecting the former with the filters. The filtered liquid leaves the filters through the branch lines 46, 47, controlled by valves 46', 47', and the main conduit 48 which conducts the filtered liquid to the upper compartment 71 of an auxiliary condenser C. The latter comprises a condenser element 73 disposed within an evaporating chamber 75; and it has a condensate chamber 77 at its lower end.

The vapors produced by the evaporation of the filtered liquid at the outside of the tubes of condenser 73 pass through conduit 79 to an intermediate part of the upper column of a rectifying column R.

The rectifying column R is of customary construction, and comprises a lower column 50 and an upper column 54. The upper end of column 50 communicates with a condenser 51, and has a liquid collecting shelf 52 disposed immediately below the condenser 51. An oxygen evaporation chamber 53 is disposed at the lower end of column 54 and surrounds condenser 51. Oxygen-containing liquid collecting at the lower end of column 50 is transferred by a valve-controlled conduit 55 to an intermediate point of the upper column 54. Liquid high in nitrogen collects at the shelf 52 and is transferred to the upper end of column 54 through valve-controlled conduit 56 to provide a reflux liquid for that column. A selected portion of liquid in conduit 55 may be transferred through valve-controlled conduit 81 to the chamber 71 of the auxiliary condenser C to prevent accumulation of liquid in chamber 53.

The impurity-free gaseous fraction leaves the scrubber 35 through a conduit 57 and is conducted to the lower portion of the lower column 50. Gaseous oxygen is withdrawn from chamber 53 and conducted through conduit 58 to condenser 73. The liquid oxygen formed in the condenser tubes is collected in chamber 77, and withdrawn through conduit 82 and valve-controlled conduit 83. A branch line 84 conducts excess liquid oxygen from condenser 73 to evaporation chamber 53.

The nitrogen product of the separation leaves the top of the upper column 54 through a conduit 60 and flows to the lower end of the main heat exchanger 32, and thence through the latter in countercurrent heat exchange relation with the high pressure air in the exchanger tubes. The nitrogen leaves exchanger 32 through conduit 61 which conducts it to the lower end of similar heat exchanger 18. The nitrogen leaves the latter through conduit 62.

The liquid entering the compartment 71 of condenser C through conduit 48 is partially vaporized by heat exchange with the oxygen in the condenser tubes. The vapors thus produced are conducted to a mid-portion of the rectifying column 54 as previously mentioned. The residual liquid, in which the solid impurities have been concentrated, is pumped under pressure through one or more of the filters 42 and 43, thereby removing solids formed during concentration of the oxygen-containing liquid in chamber 75, together with any solids which may have accidentally been passed by an imperfect filter element during the initial filtration. For this purpose, a conduit 87, having therein a rotary fluid pump 89, is connected through branch conduits 91, 92, controlled by valves 91', 92', with the inlets to the filters 42, 43. A pump adapted for this service is described in U. S. Patent No. 2,340,737 of G. H. Zenner and E. F. Yendall.

The filter 42, or 43 may be purged of solid impurities, when desired, by closing valves 44', 46' and 91', or 45', 47' and 92', and passing nitrogen, which may have been previously heated, from conduit 95 to one of two branch conduits 96, 97, controlled by valves 96', 97', and thence into the corresponding filter. Thus, if it is desired to thaw out the filter 42, valves 44', 46' and 91' are closed, and valves 96' and 99' are opened. A stream of warm dry nitrogen then flows from conduit 95 through connection 96 to the interior of the filter, through the filter element of porous ceramic material or porous metal, and then out through line 99. Substantially all of the solid impurities collected on the filter are vaporized and blown out. When the purged filter is to be returned to service it is preferably cooled down gradually by opening valve 44' slightly to allow a small flow of liquid to pass through the filter, the resultant vapors being blown out through line 99. When the filter 42 is sufficiently cooled, valve 99' is closed and the valve 46' opened. When filter 42 is fully in service, valve 44' preferably is used as a pressure-reducing valve for reducing the pressure of the liquid to be filtered from the pressure of the scrubber 35 to the pressure of the reflux compartment of the auxiliary condenser C. In the apparatus of the type illustrated, such pressure reduction will be from about 75 pounds per square inch to about 20 pounds per square inch.

In one form of the invention, the valve 91' or 92' is so regulated and the pump 89 so operated that a quantity of the liquid in evaporating chamber 75 equal to about 5% to 10%, and preferably around 10%, of the total quantity of the liquid flowing from the scrubber 35 through line 41 is withdrawn from chamber 75 and is pumped through line 87 and one of the branch lines 91, 92, and through the corresponding filter. The scrubber liquid may contain around 32% of oxygen; and the liquid in chamber 75 may contain around 65% of oxygen. Thus, as previously explained, the liquid mixture passing through the filter contains around 35% oxygen, and can safely be filtered, yet the solids removal efficiency of the filter is good. The oxygen content of the liquid in the reflux compartment is not affected by the recirculation but remains around 65%, in approximate equilibrium with the vapors leaving through conduit 79 which contain around 32% of oxygen.

During operation, the vaporization of liquid in chamber 75 and removal of the vapor through conduit 79 continuously further concentrates and precipitates solid impurities present in the liquid. When recirculating an amount of liquid corresponding to about 10% of the liquid leaving the scrubber, with a filter efficiency of 90% or better, the solids present in chamber 75 are limited in amount to approximately the amount thereof present in the unfiltered scrubber liquid.

By the practice of the present invention it is possible to readily and safely remove from concentrated oxygen-containing fluids solid impurities such as carbon dioxide and hydrocarbons which may have been formed upon concentration of the filtered liquid, or as a result of having been passed by an imperfect filter in an earlier filtration stage.

The amount of contaminated liquid which is recycled is sufficient to maintain the auxiliary condenser clean and free from deposited solid impurities, while not raising the oxygen content of the liquid passing the filters to a point where hazards may arise from flashing of hydrocarbon impurities. Any local loss of filter efficiency caused by the accidental breakage of a single filter stone in a bank of six may be automatically nullified; and deposition of solid impurities in the reflux compartment is minimized or prevented.

While the invention has been specifically described in connection with the separation of the components of air to produce oxygen, the principles thereof are not limited to such use but are applicable to the low temperature liquefaction and/or separation of other gas mixtures containing carbon dioxide and hydrocarbons such, for example, as coke oven gases.

It is obvious that various modifications of the invention may be made without departing from the essential features thereof.

I claim:

1. In a process for the separation of air containing high boiling point impurities by rectification at low temperatures wherein a compressed cooled gas mixture is separated into an impurity-free gas fraction and a liquid fraction containing said impurities, the gas fraction is passed to a relatively high pressure rectification zone, the said liquid fraction is filtered to remove solid impurities therein, the filtered fraction is progressively vaporized whereby solid impurities are concentrated in the liquid residue in a vaporization zone, and the resultant vapors are rectified; the improvement which comprises the steps of filtering a selected portion of unvaporized liquid residue from said vaporization zone, mixing the resultant filtered liquid residue with said filtered liquid fraction, and conducting the resultant mixture to said vaporization zone, thereby preventing the accumulation of solid impurities in said zone.

2. In a process for eliminating high boiling point impurities during the separation of a gas mixture by rectification at low temperatures, which includes the steps of separating compressed cooled air into a gaseous fraction which is rectified under pressure and a liquid fraction containing solid impurities that undergoes a reduction in pressure, is filtered to remove such impurities and progressively vaporized in a vaporization zone by heat exchange with gaseous oxygen being condensed to form liquid oxygen, and the resultant vapors conducted to a rectification zone, the improvement which comprises filtering a selected portion of the concentrated liquid residue from said vaporization of the filtered liquid fraction, and conducting said filtered liquid residue to said vaporization zone concurrently with said filtered liquid fraction, the proportions of the filtered liquid fraction and the filtered liquid residue fed to the vaporization zone being such that the oxygen content of the liquid mixture leaving the filter medium will not be substantially above 50%.

3. In a process for eliminating high boiling point impurities during the separation of a gas mixture by rectification at low temperatures, which includes the steps of separating compressed cooled air into a gaseous fraction which is rectified under pressure and a liquid fraction containing solid impurities that undergoes a reduction in pressure, is filtered to remove such impurities and progressively vaporized in a vaporization zone by heat exchange with gaseous oxygen being condensed to form liquid oxygen, and the resultant vapors conducted to a rectification zone, the improvements which comprises filtering a selected portion of the concentrated liquid residue from said vaporization of the filtered liquid fraction, and conducting said filtered liquid residue to said vaporization zone concurrently with said filtered liquid fraction, the proportions of the filtered liquid fraction and the filtered liquid residue fed to the vaporization zone being such that the amount of solid impurities in the liquid residue is not substantially higher than the amount thereof present in the unfiltered liquid fraction.

4. In a process for eliminating high boiling point impurities during the separation of a gas mixture by rectification at low temperatures which includes the steps of separating compressed cooled air into a gaseous fraction which is rectified under pressure and a liquid fraction containing solid impurities that undergoes a reduction in pressure, is filtered to remove such impurities and progressively vaporized in a vaporization zone by heat exchange with gaseous oxygen being condensed to form liquid oxygen, and the resultant vapors conducted to a rectification zone, the improvement which comprises filtering a selected portion of the concentrated liquid residue from said vaporization of the filtered liquid fraction, and conducting said filtered liquid residue to said vaporization zone concurrently with said filtered liquid fraction, the proportions of said filtered liquid fraction and said filtered liquid residue fed to the vaporization zone being approximately in a ratio by weight between around 10 to 1 and 20 to 1.

5. In a process for eliminating high boiling point impurities during the separation of a gas mixture by rectification at low temperatures, which includes the steps of separating compressed cooled air into a gaseous fraction which is rectified under pressure and a liquid fraction containing solid impurities that undergoes a reduction in pressure, is filtered to remove such impurities and progressively vaporized in a vaporization zone by heat exchange with gaseous oxygen being condensed to form liquid oxygen, and the resultant vapors conducted to a rectification zone, the improvement which comprises filtering a selected portion of the concentrated liquid residue from said vaporization of the filtered liquid fraction, and conducting said filtered liquid residue to said vaporization zone concurrently with said filtered liquid fraction, the proportions of the filtered liquid fraction and the filtered liquid residue fed to the vaporization zone being approximately in a ratio by weight around 10 to 1.

6. In a process for eliminating high boiling point impurities during the separation of a gas mixture by rectification at low temperatures, which process includes the steps of separating compressed cooled air into a gaseous fraction which is rectified under relatively high pressure and a liquid fraction which undergoes a reduction in pressure and is conducted to a vaporization zone and into heat exchange with gaseous oxygen being condensed, thereby vaporizing portions of said liquid fraction, leaving a liquid residue containing a high concentration of solid impurities, and the resultant vapors are rectified under a relatively low pressure, the improvement which comprises filtering said liquid fraction prior to its introduction into said vaporization zone, thereby removing solid impurities present therein, concurrently withdrawing from said vaporization zone and filtering said liquid residue containing solid impurities, and passing the respective filtered liquids to said vaporization zone under conditions preventing accumulation of solid impurities in said vaporization zone.

7. In a process for eliminating high boiling point impurities during the separation of a gas mixture by rectification at low temperatures, which process includes the steps of separating compressed cooled air into a gaseous fraction which is rectified under relatively high pressure and a liquid fraction which undergoes a reduction in pressure and is conducted to a vaporization zone and into heat exchange with gaseous oxygen being condensed, thereby vaporizing portions of said liquid fraction, leaving a liquid residue containing a high concentration of solid impurities, and the resultant vapors are liquefied under a relatively low pressure, the improvement which comprises continuously filtering said liquid fraction prior to its introduction into said vaporization zone, thereby removing solid impurities present therein, continuously withdrawing a selected portion of said liquid residue containing solid impurities from said vaporization zone, filtering said liquid residue containing solid impurities, and conducting the respective filtered liquids to said vaporization zone under conditions preventing accumulation of solid impurities in said vaporization zone.

8. In a process for eliminating high boiling point impurities during the separation of a gas mixture by rectification at low temperatures, which process includes the steps of separating compressed cooled air into a gaseous fraction which is rectified under relatively high pressure and a liquid fraction which undergoes a reduction in pressure and is conducted to a vaporization zone and into heat exchange with gaseous oxygen being condensed, thereby vaporizing portions of said liquid fraction, leaving a liquid residue containing a high concentration of solid impurities, and the resultant vapors are liquefied under a relatively low pressure, the improvement which comprises continuously filtering said liquid fraction prior to its introduction into said vaporization zone, thereby removing solid impurities present therein, intermittently withdrawing a selected portion of said liquid residue containing solid impurities from said vaporization zone, filtering said liquid residue containing solid impurities, and conducting the respective filtered liquids to said vaporization zone under conditions limiting accumulation of solid impurities in said vaporization zone.

9. In a process for eliminating high boiling point impurities during the separation of a gas mixture by rectification at low temperatures, which process includes the steps of separating compressed cooled air into a gaseous fraction which is rectified under relatively high pressure and a liquid fraction which undergoes a reduction in pressure and is conducted to a vaporization zone and into heat exchange with gaseous oxygen being condensed, thereby vaporizing portions of said liquid fraction, leaving a liquid residue containing a high concentration of solid impurities, and the resultant vapors are liquefied under a relatively low pressure, the improvement which comprises filtering said liquid fraction prior to its introduction into said vaporization zone, thereby removing solid impurities present therein, concurrently withdrawing a portion of said liquid residue from said vaporization zone, mixing the withdrawn liquid residue with unfiltered liquid fraction, filtering the resultant mixture, and conducting the filtered mixture to said vaporization zone under conditions preventing accumulation of solid impurities in said vaporization zone.

10. Apparatus for the elimination of carbon dioxide, hydrocarbons, and like high boiling point impurities from gas mixtures containing the same prior to separation of such gas mixtures by low temperature rectification in rectifying columns, which comprises means for cooling such a gas mixture and for converting at least a portion of the carbon dioxide therein into the solid state in suspension in said gas mixture; means for expanding such cooled gas mixture to form a partially liquid mixture at a low pressure; means for separating the expanded mixture into a gaseous fraction substantially free from solid impurities and a liquid fraction containing solid impurities; a filter connected with said separating means for receiving and filtering said liquid fraction; means for conducting said gaseous fraction to one of said rectifying columns; a heat exchanger having a vaporizing chamber and a condensing chamber; means for conducting to such vaporizing chamber the filtered liquid fraction leaving said filter; means connecting said vaporizing chamber with another of said rectifying columns for conducting impurity-free vapors of said filtered liquid fraction to said column; and means connecting said vaporizing chamber with the inlet of said filter, the last-named means including a pump for withdrawing from said vaporizing chamber a selected portion of the liquid therein and for forcing the same through said filter, thereby removing solid impurities present in said portion resulting from the concentration of impurities in the liquid within said vaporizing chamber.

11. Apparatus for the elimination of carbon dioxide, hydrocarbons, and like high boiling point impurities from gas mixtures containing the same prior to separation of such gas mixtures by low temperature rectification in rectifying columns, which comprises means for cooling such a gas mixture and for converting at least a portion of the carbon dioxide therein into the solid state in suspension in said gas mixture; means for expanding such cooled gas mixture to form a partially liquid mixture under lower pressure; means for separating the expanded gas into a gaseous fraction substantially free from solid impurities and a liquid fraction containing solid impurities; a filter connected with said separating means for filtering said liquid fraction; means for conducting said gaseous fraction to one of said rectifying columns; a heat exchanger having a vaporizing chamber and a condensing chamber; conduit means connecting the outlet of said filter with said vaporizing chamber for conducting to the latter the filtered liquid fraction leaving said filter; means connecting said vaporizing chamber with another of said rectifying columns for conducting to said column impurity-free vapors; and conduit means connecting said vaporizing chamber with said filter, the least-named means including a pump for withdrawing from said vaporizing chamber a selected portion of the liquid therein and for forcing the same through said filter, thereby removing solid impurities present in said portion resulting from the concentration of impurities in the liquid within said vaporizing chamber; means for separately withdrawing nitrogen and oxygen from the last-named rectifying column; and means for passing oxygen thus withdrawn through said condensing chamber in heat-exchange relation with the filtered liquid and vapors in said vaporizing chamber.

12. In a process for the separation of air containing high boiling point impurities by rectification at low temperatures wherein a compressed cooled gas mixture is separated into an impurity-free gas fraction and a liquid fraction containing said impurities, the gas fraction is passed to a relatively high pressure rectification zone, the said liquid fraction is filtered to remove solid impurities therein, the filtered fraction is progressively vaporized in a vaporization zone whereby solid impurities are concentrated in the liquid residue, and the resultant vapors are rectified; the improvement which comprises the steps of mixing the unvaporized liquid residue from said vaporization zone with said liquid fraction, filtering the resultant liquid mixture, and conducting the filtered mixture to said vaporization zone, thereby preventing the accumulation of solid impurities in said vaporization zone.

EDWARD F. YENDALL.

REFERENCES CITED

The following references are of record in the file of this patent:

UNITED STATES PATENTS

| Number | Name | Date |
|---|---|---|
| 2,337,474 | Kornemann et al. | Dec. 21, 1943 |
| 2,287,158 | Yendall | June 23, 1942 |
| 2,287,137 | Ross | June 23, 1942 |